(No Model.) 2 Sheets—Sheet 1.
D. DIECKMANN & C. SCHMIEDTZINSKY.
PUMP.
No. 289,517. Patented Dec. 4, 1883.
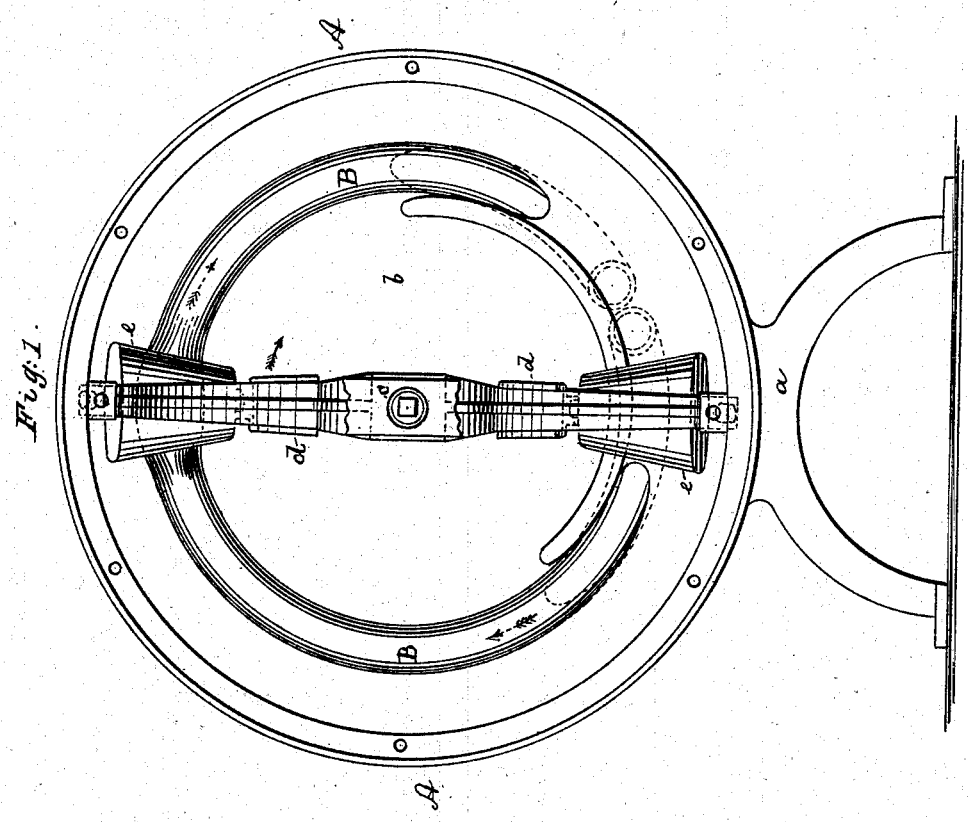
WITNESSES:
Geo. Obermeyer.
Jos. J. McGinley.
INVENTORS
Diedrich Dieckmann &
Carl Schmiedtzinsky
by their attorney

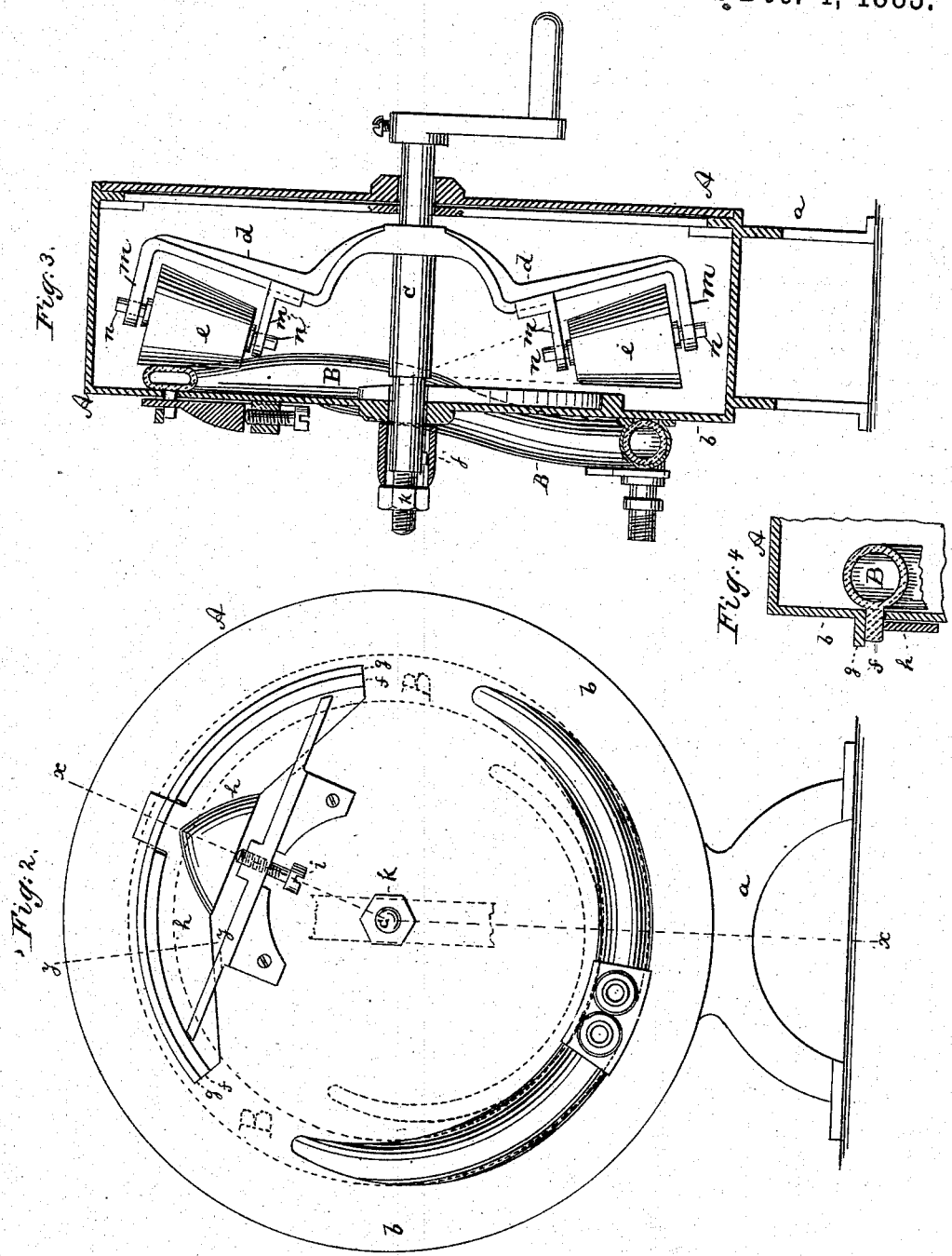

UNITED STATES PATENT OFFICE.

DIEDRICH DIECKMANN AND CARL SCHMIEDTZINSKY, OF NEW YORK, N. Y.

PUMP.

SPECIFICATION forming part of Letters Patent No. 289,517, dated December 4, 1883.

Application filed January 30, 1883. (No model.)

*To all whom it may concern:*

Be it known that we, DIEDRICH DIECKMANN and CARL SCHMIEDTZINSKY, both of the city of New York, in the county of New York and State of New York, have invented a new and useful Improvement in Pumps, of which the following specification is a full, clear, and exact description.

This invention relates to that class of pumps in which a flexible curved tube is compressed by rollers, which produce suction behind and a forcing effect in front of them.

The invention has for its object to devise various improvements in the construction of such pumps; and it consists, principally, in the combination of a casing, curved flexible tube, central shaft, and arms having bearings with conical rollers having journals which rest in said bearings; also, in the details of improvement hereinafter more fully pointed out.

In the accompanying sheets of drawings, Figure 1 is a front elevation of our improved pump, with the face-plate removed. Fig. 2 is a rear view of the same; Fig. 3, a vertical transverse section on the line $x\ x$, Fig. 2; and Fig. 4, a detail section on the line $y\ y$, Fig. 2.

Similar letters of reference indicate corresponding parts in all the figures.

The letter A represents the casing of our pump, made of cylindrical or other shape, and supported upon a foot, $a$. Against the inner side of the back $b$ of this casing is laid, in a circle or horseshoe shape, a flexible tube, B, of rubber or equivalent material, and held thereto by means hereinafter specified. One end of this tube connects with the reservoir and the other with the discharge-nozzle.

$c$ is a crank-shaft hung in the center of the tube B and adapted to be revolved by suitable means. This shaft has two (more or less) arms, $d$. Each of these arms is provided with two lugs or bearings, $m\ m$, in which rests the journal $n$ of a conical roller, $e$. The rollers $e$ are thus properly supported at both ends, and by turning the crank-shaft $c$ they will pass over and compress the tube B. The taper of the rollers $e$ should be preferably such that the apex of the completed cone would lie in the center of the shaft $c$. (Dotted lines, Fig. 3.)

In order to properly hold the tube B against the side of the back $b$, it is provided with a flange, $f$, Fig. 4, extending through a slot in back $b$. This flange is clamped between a rib, $g$, on back $b$ and a slide, $h$, operated by a set-screw, $i$, or in equivalent manner.

The amount of pressure of the rollers $e$ upon the tube B may be regulated as follows: The shaft $c$ is extended backward through the casing A, and is provided with a sleeve, $j$, and nut $k$, Fig. 3. By tightening said nut the rollers $e$ are drawn toward the tube and compress the same to a greater extent. By loosening the nut the tube B itself will act as a spring for pushing the rollers away from it. The tube B should be curved backward near its ends, so that the pressure of the rollers may be stronger near its center than near its ends. Fig. 3 shows this curve of the tube.

The operation of the pump is as follows: By revolving the shaft $c$ the rollers $e$ pass over and compress the tube B. Said rollers will create a suction behind and a forcing effect in front of them in the direction from the reservoir toward the discharge.

We claim as our invention—

1. The combination of casing A, curved flexible tube B, shaft $c$, and arms $d$, having bearings $m$, with conical rollers $e$, having journals $n$, which rest in the bearings $m$, substantially as herein shown and described.

2. The combination, in a pump having a flexible tube, B, provided with the flange $f$, which is clamped between a rib, $g$, and a slide, $h$, and means for compressing said tube, all arranged substantially as described, and for the purpose specified.

3. The combination of the casing A, flexible tube B, and rollers $e$, for compressing said tube, with the shaft $c$, having nut $k$, all being so arranged that the tube B acts as a spring to force the rollers $e$ back when the nut $k$ is loosened, substantially as specified.

DIEDRICH DIECKMANN.
CARL SCHMIEDTZINSKY.

Witnesses:
F. V. BRIESEN,
JOS. J. MCGINLEY.